(12) United States Patent
Bezanilla et al.

(10) Patent No.: US 9,186,874 B1
(45) Date of Patent: Nov. 17, 2015

(54) HEAT SEALING TECHNIQUES FOR BONDING SHEET MATERIALS

(71) Applicant: ReadyOne Industries, Inc., El Paso, TX (US)

(72) Inventors: Juan M. Bezanilla, El Paso, TX (US); Hector M. Hernandez, El Paso, TX (US)

(73) Assignee: READYONE INDUSTRIES, INC., El Paso, TX (US)

( * ) Notice: Subject to any disclaimer, the term of this patent is extended or adjusted under 35 U.S.C. 154(b) by 263 days.

(21) Appl. No.: 13/873,632

(22) Filed: Apr. 30, 2013

Related U.S. Application Data

(60) Provisional application No. 61/640,147, filed on Apr. 30, 2012.

(51) Int. Cl.
*B32B 37/00* (2006.01)

(52) U.S. Cl.
CPC .................................. *B32B 37/0046* (2013.01)

(58) Field of Classification Search
CPC ........ B29C 65/04; B29C 65/12; B29C 65/22; B29C 65/38; B29C 65/74; B29C 65/7451; B29C 66/81463; B29C 66/8322; B29C 66/83221; B32B 37/0046; B32B 38/0036; B32B 41/00
USPC .......... 156/351, 358, 359, 366, 367, 368, 378
See application file for complete search history.

(56) References Cited

U.S. PATENT DOCUMENTS

| | | | | |
|---|---|---|---|---|
| 5,366,580 | A | * | 11/1994 | Czach ........................... 156/359 |
| 6,620,291 | B1 | * | 9/2003 | Gartland et al. ........... 156/580.1 |

* cited by examiner

*Primary Examiner* — George Koch
(74) *Attorney, Agent, or Firm* — K&L Gates LLP

(57) ABSTRACT

Various embodiments of a bonding machine structured and programmed for bonding or laminating one or more materials is disclosed. In one embodiment, the bonding machine comprises a support bar and one or more bonding arms movably coupled to the support bar. Each of the bonding arms may include a heating bar including one or more heating elements, and an actuator configured to provide movement of the bonding arm between the support bar and a material to be processed. At least one of the bonding arms may be programmed to operate with a temperature setting, pressure setting, application timing setting, timing sequence setting, or center position setting which is independent of at least one of the other bonding arms.

13 Claims, 21 Drawing Sheets

HEAT SEALING TECHNIQUES FOR BONDING SHEET MATERIALS

CROSS REFERENCE TO RELATED APPLICATION/PRIORITY CLAIM

The present application claims the benefit of U.S. Provisional Patent Application Ser. No. 61/640,147, filed on Apr. 30, 2012, the entirety of which is hereby incorporated herein by reference.

BACKGROUND

Heat sealing is a process that may be used to bond different parts of various materials, such as fabric-based articles, clothing articles, or construction materials, for example. The bonded materials may include uniform thermoplastics, monolayer materials, or materials having several layers. Heat sealing may be used to bond similar or different types of materials with bonding agents such as tape or other adhesives. It can be appreciated that effective heat seals are a function of the correct temperature, pressure, and application time, among other factors, for the materials to be bonded. However, many conventional bonding machines and processes are limited in scope to specific bonding applications which apply rigidly set temperatures, pressures, and application times for bonding materials.

In view of the problems existing in the prior art, it would be desirable to have enhanced bonding tools and techniques that employ adjustable pressure, temperature, and/or timing processes to more effectively and efficiently bond together different kinds of materials. It would also be desirable to have a bonding machine that can be programmed to apply different pressure, temperature, and/or timing techniques to create different types of bonds using heat sealing processes.

BRIEF DESCRIPTION OF THE FIGURES

The utility of the embodiments of the invention will be readily appreciated and understood from consideration of the following description when viewed in connection with the accompanying drawings, wherein.

DESCRIPTION

Various embodiments of a bonding machine for heat bonding or laminating one or more materials are disclosed. In one example embodiment, the bonding machine comprises a horizontal support bar with one or more bonding arms slidably coupled to the horizontal support bar. The bonding arms may be moved along the horizontal support bar to change the bonding center for each bar. The one or more bonding arms may comprise a heating bar including one or more heating elements; an actuator configured to provide vertical movement of the bonding arm relative to the horizontal support bar; and at least one sensor. The bonding arms may be individually and independently adjustable such that each bonding arm has a temperature setting, a pressure setting, an application timing setting, a sequence setting, and/or a center position setting independent of one or more of the other bonding arms.

Various embodiments of a bonding table are also disclosed. The bonding table may include one or more alignment markings for assisting in aligning the bonding machine and the one or more materials to be bonded to promote a proper bond. In certain embodiments, the bonding machine and the bonding table may be formed as a single unit. In other embodiments, the bonding table and the bonding machine may be individual units connected by any suitable connection, such as screws, bolts, or welds.

Figure 1:
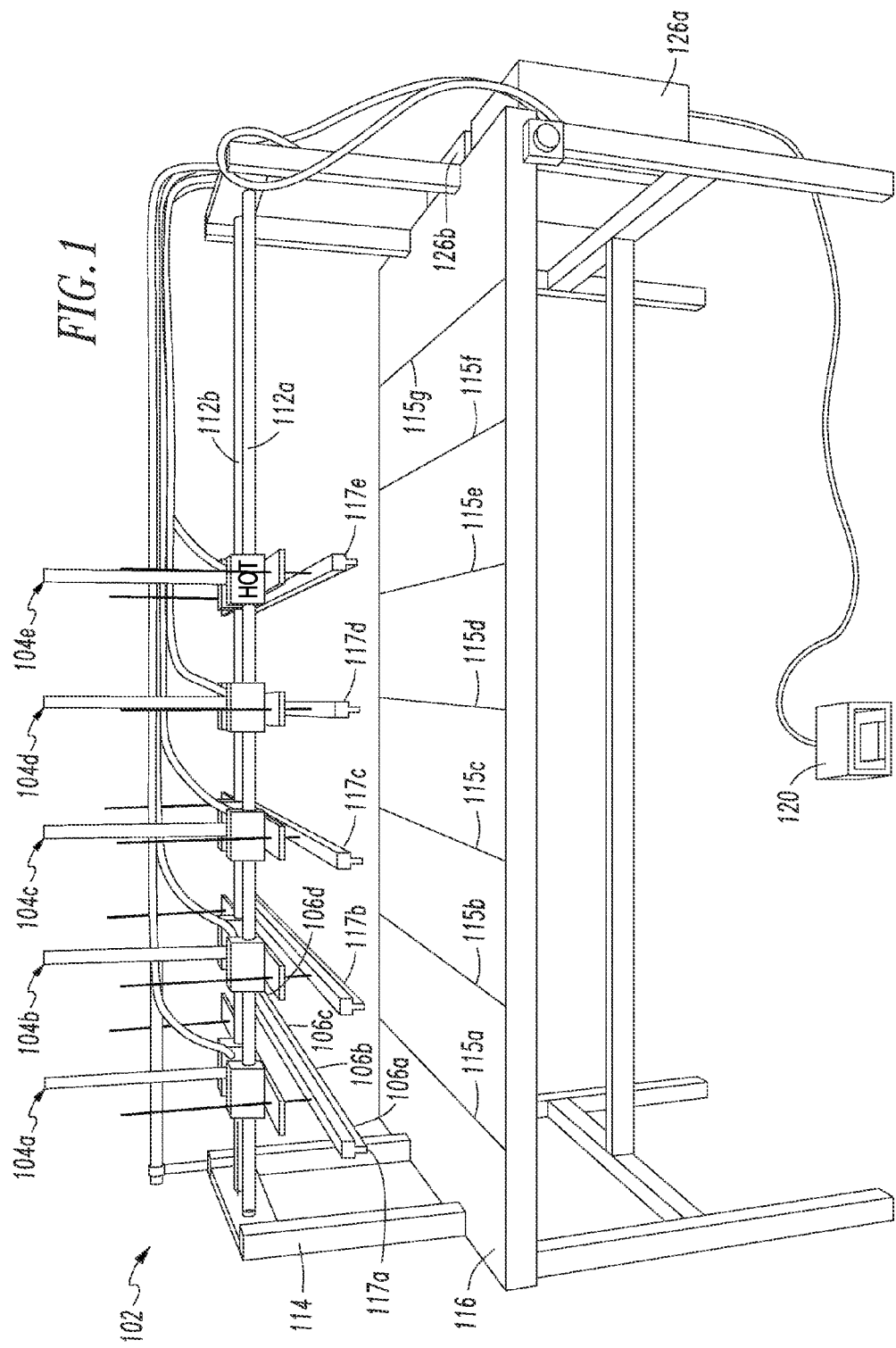
FIGS. 1 and 2 illustrate an example of a bonding machine structured for bonding one or more materials.
Figure 2:
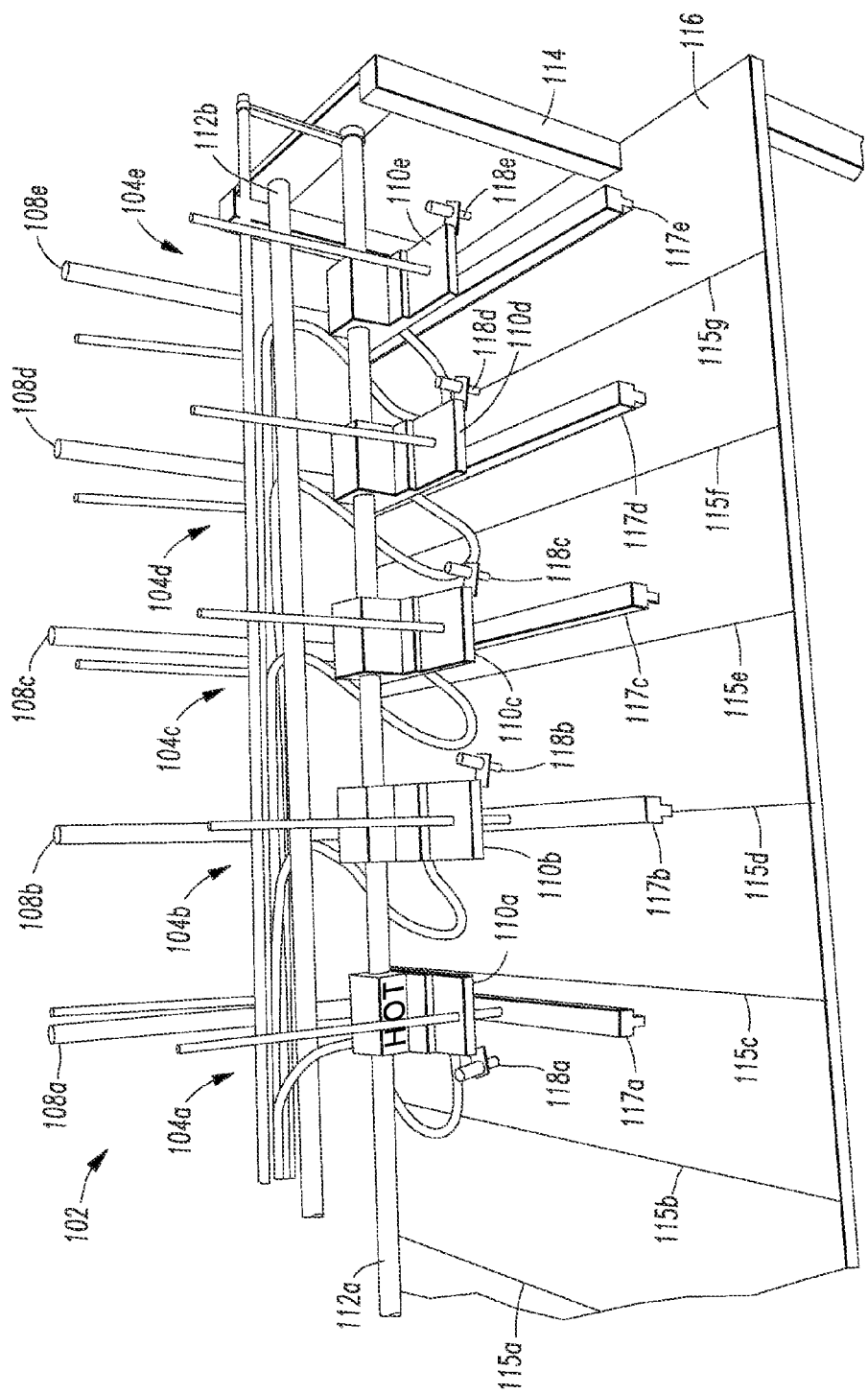

FIGS. 1 and 2 illustrate an example of a bonding machine 102 configured for heat bonding one or more materials. The bonding machine 102 comprises one or more bonding arms 104. In the illustrated embodiment, the bonding machine comprises five bonding arms 104a-104e. Each of the bonding arms 104a-104e may include a plurality of heating elements 106 (such as heating elements 106a-106d, which are part of a heating bar 117), a pneumatic actuator 108a-108e, and one or more horizontal supports 110a-110e. The horizontal supports 110a-110e may be slidably interfaced with one or more guide rails 112a, 112b. In the example shown, the guide rails 112a, 112b are supported by vertical supports 114 connected to a bonding table 116.

In various embodiments, the heating elements 106 may be aligned in a horizontal pattern along each of multiple heating bars 117a-117e. The heating bars 117a-117e may be connected to a corresponding pneumatic actuator 108a-108e, such that the heating bars 117a-117e can be extended or retracted with respect to the vertical support 114. The heating elements 106 may comprise any suitable element for delivering one or more forms of energy to a bonding material and/or a bonding agent located on the bonding table 116. In the illustrated embodiment, the heating elements 106 are thermal heating elements for delivering thermal energy to the bonding material. In certain embodiments, the heating elements 106 may comprise infrared elements, ultrasonic elements, or other elements or components suitable for imparting energy to a bonding agent to cause the bonding agent (e.g., a heat-activated tape) to set. For example, each of the heating elements 106 may comprise a 300-Watt or 500-Watt cartridge heater to provide energy for activating a bonding agent. Those skilled in the art will recognize that any suitable wattage may be applied by the heating elements 106. It can be appreciated that the amount of energy required to bond a given material is a function of various factors, including the type and characteristics of the material.

The bonding machine 102 may be used to bond one or more materials. The materials may be of the same type or different type of materials. Examples of materials include, without limitation, fabrics and construction materials, among other types of materials that can be suitably processed by the bonding machine 102. In various embodiments, the heating elements 106 of the bonding arms 104a-104e may be heated to a predetermined temperature. The one or more materials to be bonded can be placed on the bonding table 116. A plurality of alignment markings 115a-115g may be located on the bonding table 116 to allow proper placement and alignment of the one or more materials on the bonding table 116. One or more of the heating bars 117a-117e may be extended towards the bonding table 116 to apply a predetermined pressure and/or a predetermined temperature to the one or more materials to be bonded. The heating bars 117a-117e may be programmed to maintain the predetermined pressure for a predetermined amount of time. An overall combination of temperature, pressure, application time, and/or timing sequence, of the bonding arms 104a-104e may be configured to create one or more kinds of bonds between the one or more types of materials to be bonded together.

In various embodiments, one or more of the heating elements 106 of each of the bonding arms 104a-104e may have an independently adjustable temperature. For example, in one embodiment, the first bonding arm 104a may be set to a first temperature sufficient for causing bonding of a first material. The second bonding arm 104b may be set to a second temperature different than the first temperature. In certain embodiments, the second temperature may be configured to cause bonding of a second material which is the same type of material as the first material, or a different type of material compared to the first material. In other embodiments, the second temperature may be configured to cause faster or slower bonding of the first material. In certain embodiments, the third bonding arm 104c, the fourth bonding arm 104d, and the fifth bonding arm 104e may each have respective third, fourth, and fifth temperatures. In other embodiments, one or more of the bonding arms 104a-104e may have the same temperature. For example, the first bonding arm 104a, the third bonding arm 104c, and the fifth bonding arm 104e may have a first temperature while the second bonding arm 104b and the fourth bonding arm 104d may have a second temperature. It will be recognized by those skilled in the art that many combinations of bonding arms 104a-104e and temperatures may be possible, and are within the scope of this disclosure.

In various embodiments, one or more of the pneumatic actuators 108a-108e of the bonding arms 104a-104e may each have an independently adjustable pressure or varying pneumatic bore sizes. The heating bars 117a-117e may be connected to the pneumatic actuators 108a-108e to allow vertical movement of the bonding arms 104a-104e relative to the bonding table 116. The pneumatic actuators 108a-108e may be connected to one or more regulators or valves to allow one or more of the pneumatic actuators 108a-108e to have an independent pressure. For example, in one embodiment, the first bonding arm 104a may have a first pressure applied by the first pneumatic actuator 108a. The second bonding arm 104b may have a second pressure applied by the second pneumatic actuator 108b. The first and second pressures may correspond to specific pressures desirable for bonding the one or more materials. The third bonding arm 104c, the fourth bonding arm 104d, and the fifth bonding arm 104e may each have respective third, fourth, and fifth pressures applied by their respective pneumatic actuators 108c-108e. In other embodiments, one or more of the bonding arms 104a-104e may be configured to apply the same pressure. For example, in one embodiment, the first bonding arm 104a, the second bonding arm 104b, and the third bonding arm 104c may have a first pressure applied by the pneumatic actuators 108a-108c while the fourth bonding arm 104d and the fifth bonding arm 104e may have a second pressure applied by the pneumatic actuators 108d, 108e, respectively. It will be appreciated by those skilled in the art that many combinations of pressures for the bonding arms 104a-104e may be possible and are within the scope of this disclosure. It will also be appreciated that different bore dimensions or characteristics of the pneumatic actuators 108a-108e may also be used to provide varying, independent pressures to the pneumatic actuators 108a-108e. Examples of different bore dimensions or characteristics include length, radius, mass, material composition, among many other types of dimensions or characteristics.

In various embodiments, the bonding machine 102 may be configured to provide an independently adjustable timing or application time for each bonding arm 104a-104e. During bonding, the bonding arms 104a-104e may apply a specific temperature at a specific pressure over a predetermined period of application time to promote proper bonding of the one or more materials with a desired bonding agent. After the predetermined application period has passed, the bonding arm 104a-140e may be moved into a retracted position, and/or the heating elements 106 may be deactivated. The predetermined period of application time may be independently variable for each of the bonding arms 104a-104e to allow a different bonding time for each bonding arm 104a-104e. For example, the first bonding arm 104a may have a first bonding application time. The second bonding arm 104b may have a second bonding application time. In certain embodiments, one or more of the bonding arms 104a-104e may have the same bonding time as one or more other bonding arms 104a-104e. For example, the first bonding arm 104a and the fifth bonding arm 104e may have a first bonding time, while the second bonding arm 104b, the third bonding arm 104c, and the fourth bonding arm 104d may have a second bonding time. Those skilled in the art will appreciate that many combinations of bonding arms 104a-104e and bonding application times may be possible and are within the scope of this disclosure.

In various embodiments, the bonding arms 104a-104e may be structured for adjustable spacing when mounted for use on the bonding machine 102. For example, the bonding arms 104a-104e may be slidably movable along the horizontal supports 110a-110e and/or the guide rails 122a, 122b to provide adjustable spacing between the bonding arms 104a-104e during operation of the machine 102. By providing adjustable spacing, the bonding arms 104a-104e may be variably positioned to provide different bonding patterns with respect to different articles processed by the machine 102. In one embodiment, the bonding arms 104a-104e may be slidably mounted through one or more linear bearings. The linear bearings may comprise one or more collars for locking the linear bearings to the horizontal supports 110a-110e, for example, to resist horizontal movement of the bonding arms 104a-104e during the bonding process.

In certain embodiments, one or more of the horizontal supports 110a-110e may comprise a ball screw support. The ball screw support may be structured to have a bonding arm 104a-104e operatively mounted thereon. The center position of the bonding arm 104a-104e may be adjusted by applying a rotational movement to the ball screw, which causes linear motion along the horizontal axis. In one embodiment, the ball screw may be coupled to a motor (e.g., a servo motor) to provide the rotational movement of the ball screw. In this embodiment, the bonding arm 104a-104e may be adjusted to provide multiple sealing positions for a material located on the bonding table 116.

In various embodiments, the bonding machine 102 may comprise one or more guidance systems for aligning the bonding arms 104a-104e with the one or more alignment marks 115a-115g of the bonding table 116. For example, in the embodiment illustrated in FIG. 1, the bonding arms 104a-104e each may have a guidance system comprising one or more lasers 118a-118e mounted thereon. Each of the one or more lasers 118a-118e may be configured to provide a horizontal beam along the longitudinal axis of the bonding arms 104a-104e. The horizontal beam can be projected onto the bonding table 116, such that the horizontal beam is located in a corresponding position of the bonding arm 104a-104e on the table 116 in an extended position of the bonding arm 104a-104e. By providing the horizontal beam, the one or more lasers 118a-118e promote proper alignment of the bonding arms 104a-104e and the bonding table 116 without necessarily having to extend the bonding arms 104a-104e. In various embodiments, suitable guidance systems may include a variety of devices, software, or other components that assist with identifying locations at which the bonding arms 104a-104e operatively interact with a material positioned on the table 116.

In various embodiments, the bonding machine 102 may be manually or automatically controlled. The bonding machine 102 may include one or more switches, regulators, valves, or controllers for electrically or mechanically controlling operation of the bonding arms 104a-104e, such as for setting the temperature, pressure, application timing, sequencing, or other operational aspects of the bonding arms 104a-104e. The switches, regulators, valves, and controllers may be manually operated by a user, such as by physically manipulating a switch to stop or resist electrical operation of one or more of the bonding arms 104a-104e. In one embodiment, a switch may be used to completely deactivate a bonding arm 104a-104e. In another embodiment, a switch may control only the electrical operations of a bonding arm, such as deactivating the heating elements 106 located on the bonding arms 104a-104e. A temperature controller may be employed to set a predetermined temperature for the heating elements 106 of the bonding arms 104a-104e. The pneumatic pressure of the bonding arms 104a-104e may be set by adjusting one or more pneumatic valves or air regulators to control the air pressure delivered to the pneumatic actuators 108a-108e, for example. In certain embodiments, a foot switch 120 may be used to control the application of the bonding arms 104a-104e to a material positioned on the bonding table 116.

In various embodiments, the bonding machine 102 may be controlled by one or more logic controls. In one example, a logic control may be connected to the switches, regulators, valves, and/or controllers of the bonding machine 102. One or more logic controllers may replace the switches and regulators of the bonding machine 102, for example. Any suitable form of logic control may be used, such as, for example, logic gates, a programmable logic control (PLC), a field programmable gate-array (FPGA), a software-programmable processor, or any combination thereof. Those skilled in the art will appreciate that the logic controls may be implemented in hardware, software, firmware, or reasonable combinations thereof. In one embodiment, a logic controller may be used to control one or more functions of the bonding machine 102, and manual controls (e.g., switches) may be used to control one or more additional functions of the bonding machine 102.

Figure 3:
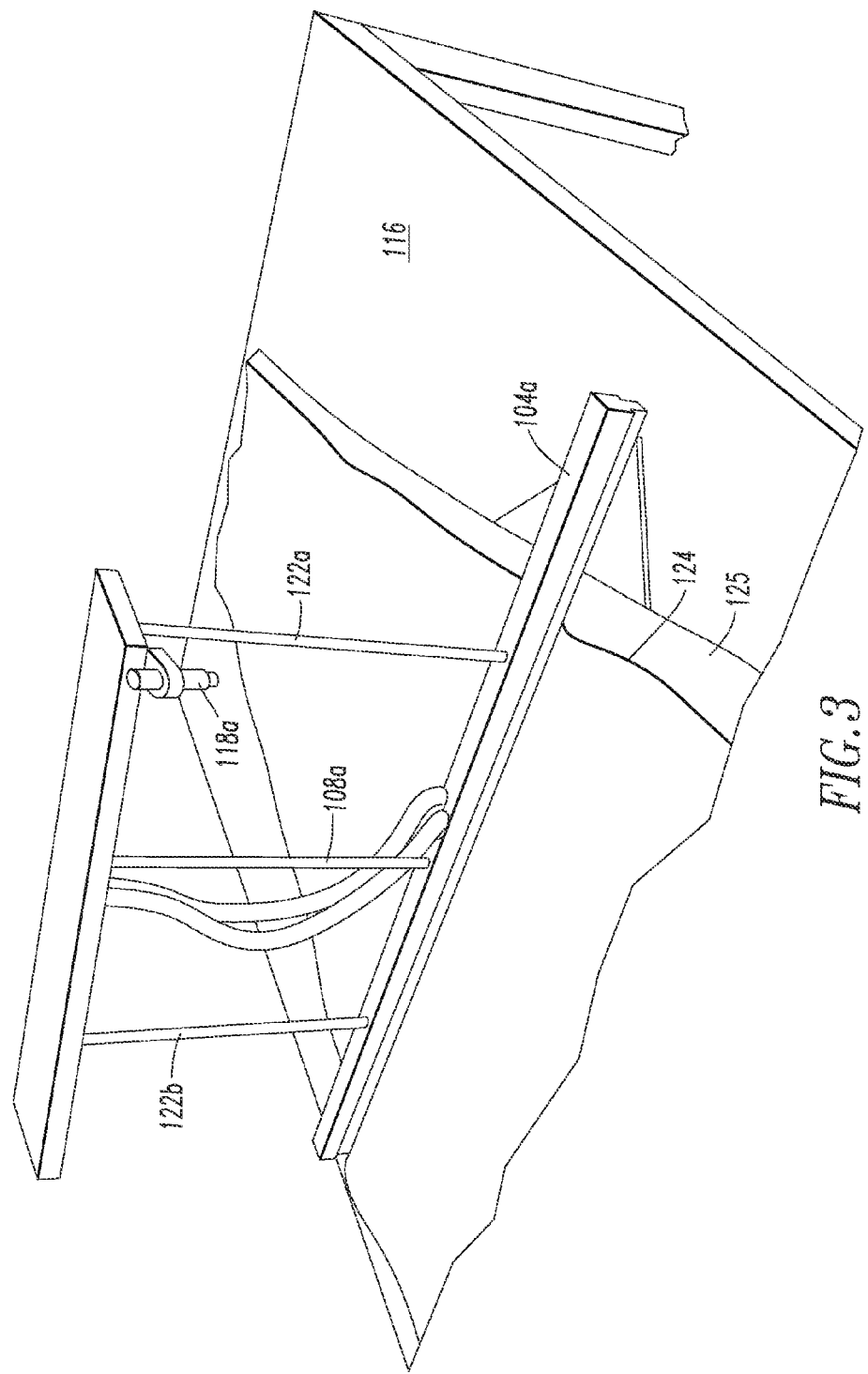
FIG. 3 illustrates an example of a bonding arm in an extended position.

FIG. 3 illustrates one example of the bonding arm 104a in a fully extended position. As shown, the pneumatic actuator 108a is connected to the bonding arm 104a at a central location. The bonding arm 104a also comprises two guide bars 122a, 122b located on either side of the pneumatic actuator 108a. The guide bars 122a, 122b provide stable movement of the bonding arm 104a between extended and retracted positions to allow for guided application of the bonding arm 104a. As can be seen in FIG. 3, the bonding arm 104a is applied to a first material 124 and a second material 125 positioned on the bonding table 116. In one embodiment, a bonding agent may be located between the first and second materials 124, 125 to create a bond in response to the application of temperature and/or pressure generated by the bonding arm 104a. In another embodiment, the first material 124 may be a bonding agent which bonds to the second material 125 in response to the application of temperature and/or pressure by the bonding arm 104a. It can be appreciated by those skilled in the art that many combinations of bonding agents and materials may be layered and processed by the bonding machine 102.

Figure 4:
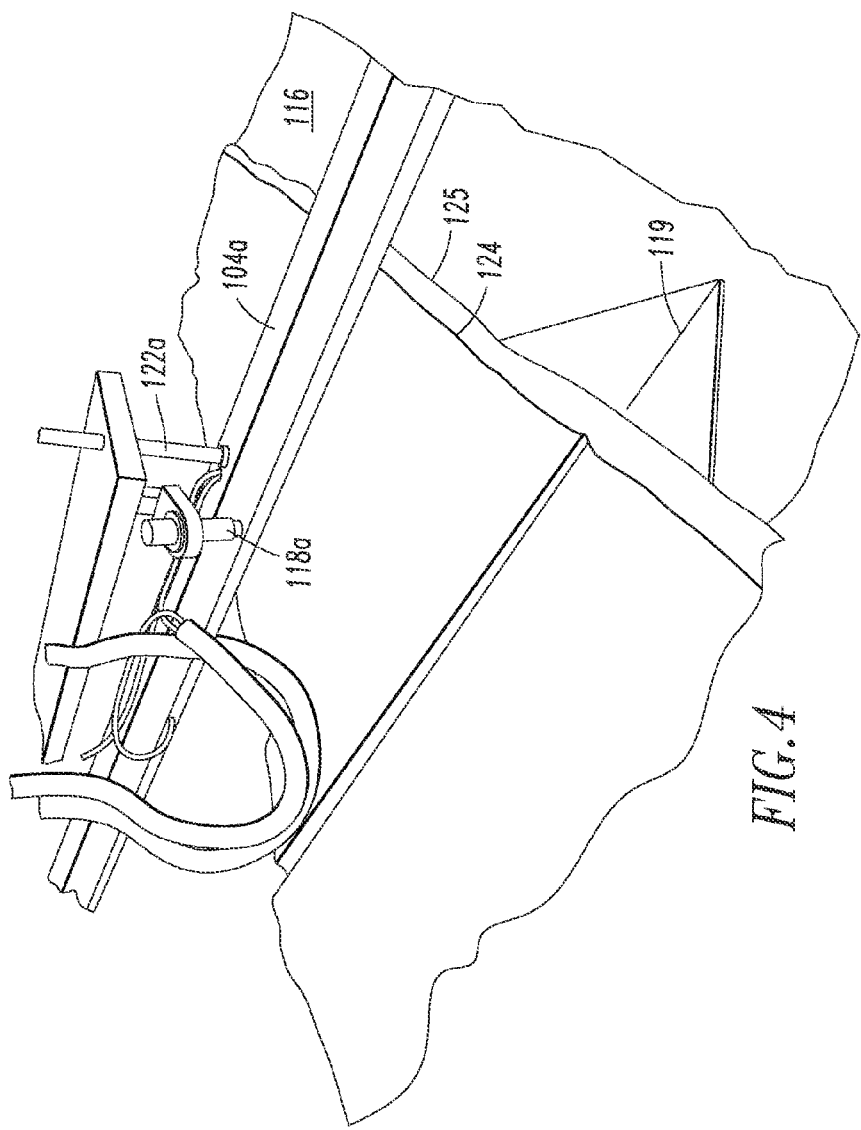
FIG. 4 illustrates an example of a bonding arm in a retracted position.

FIG. 4 illustrates one embodiment of the bonding arm 104a in a retracted position. As shown, the first and second materials 124, 125 have been bonded together along a longitudinal line corresponding to the longitudinal axis of the bonding arm 104a. FIG. 4 also illustrates one embodiment of the laser 118 providing a horizontal beam 119. The horizontal beam 119 corresponds to a position at which the bonding arm 104a would contact the bonding table 116 in a fully extended position of the bonding arm 104a. In this example, the position highlighted by the beam 119 corresponds to the location of the bond between the first and second materials 124, 125.

Figure 5A:
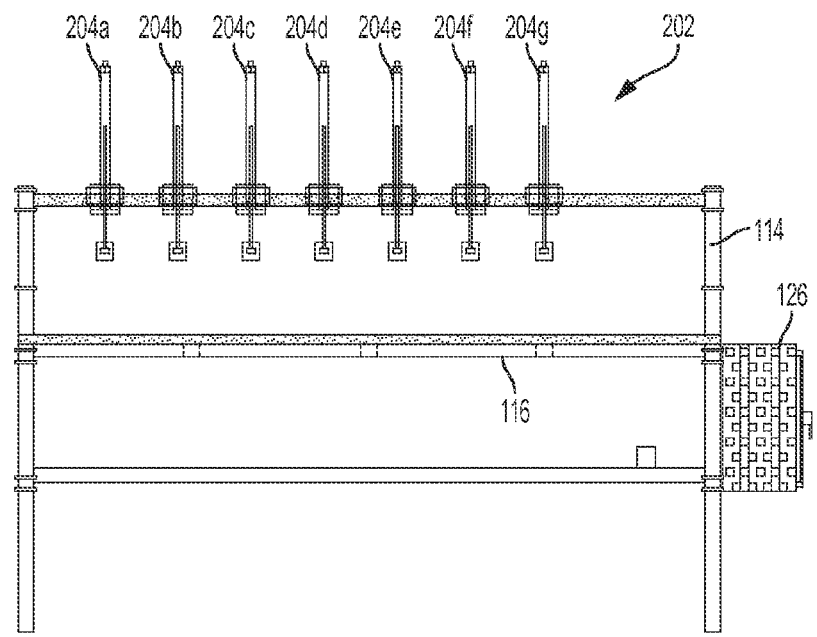
FIGS. 5A-5C illustrate aspects of an example of a bonding machine having seven bonding arms.
Figure 5B:
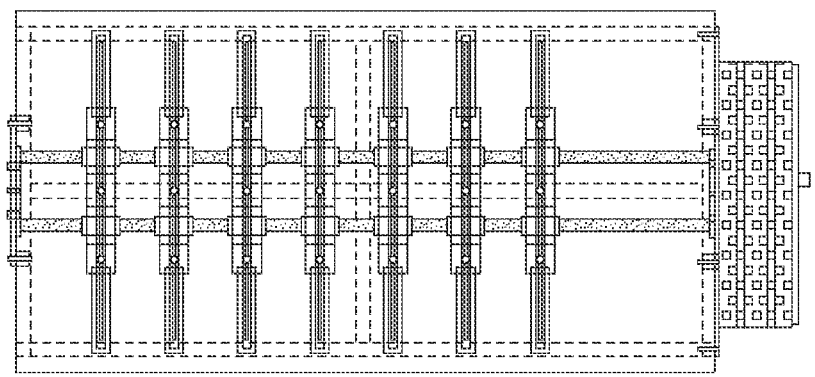
Figure 5C:
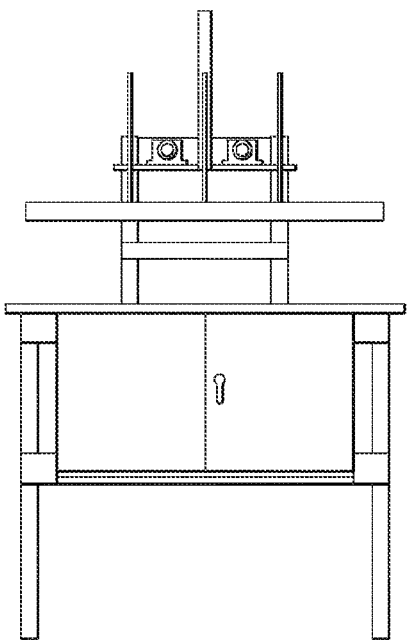

FIGS. 5A-5C illustrate various aspects of an example of a bonding table 102 comprising seven bonding arms 104a-104g. It will be appreciated by those skilled in the art that the bonding table 102 may comprise any suitable number of bonding arms 104. It will further be appreciated that the bonding arms 104a-104g may comprise any suitable dimensions for ensuring an adequate bond between one or more materials to be bonded together.

Figure 6C:
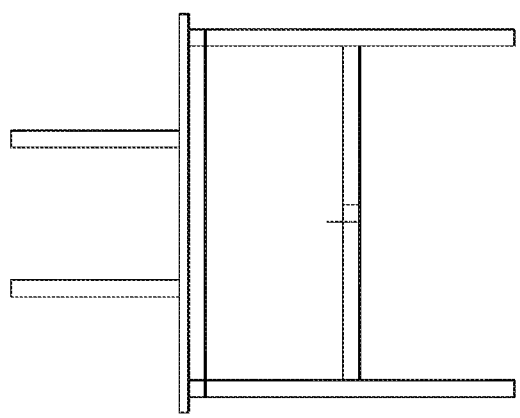
FIGS. 6A-6C illustrate various aspects of an example of a bonding table.
Figure 6A:
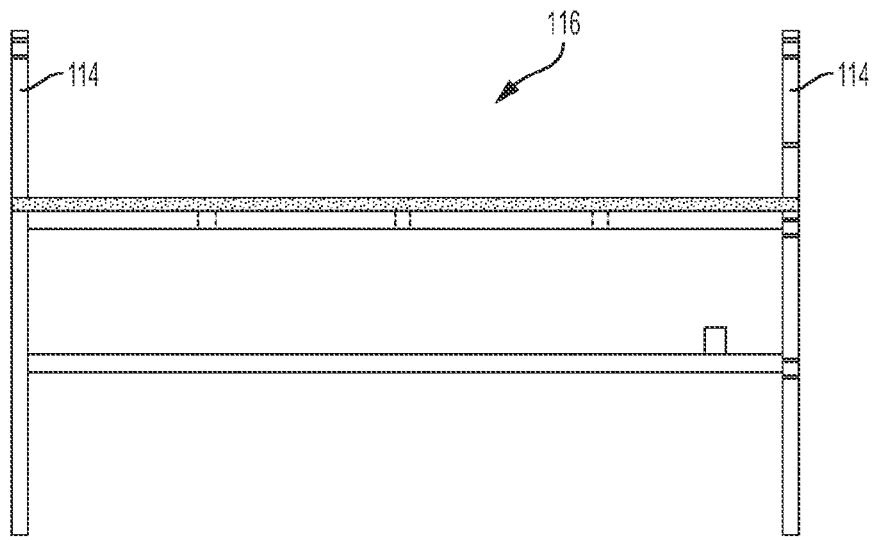
Figure 6B:
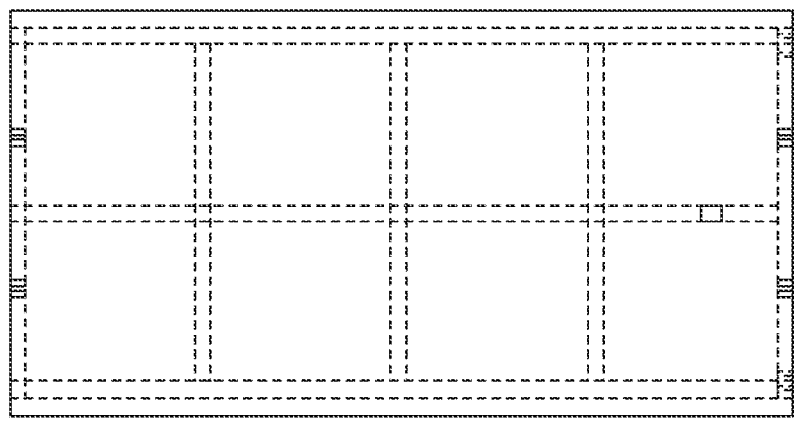

FIGS. 6A-6C shows an example of the bonding table 116. The bonding table 116 may comprise two or more vertical supports 114 for facilitating interaction of the bonding arms with the bonding table 116 (as described above). In one embodiment, the bonding table 116 may comprise one or more positioning or alignment markings to assist with aligning the bonding arms 104 over the correct positions with respect to materials positioned on the table 116 to be bonded.

Figure 7:
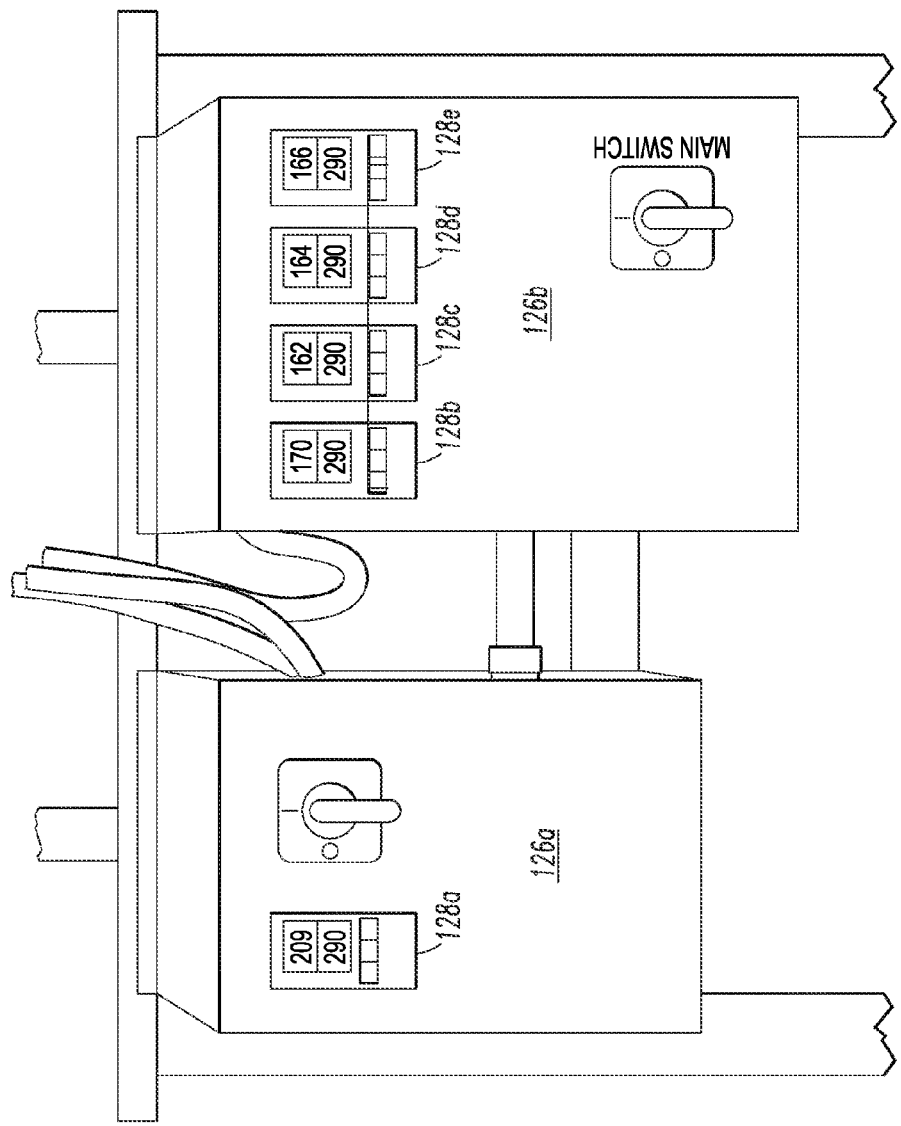
FIG. 7 illustrates an example of a control cabinet structured for use in connection with a bonding machine.

The bonding table 116 may comprise one or more control cabinets 126 for housing one or more control systems for the bonding machine 102. For example, the control cabinets 126 may comprise one or more switches for electrically disconnecting the heating elements of the bonding arms 104. In another embodiment, the control cabinet 126 may comprise one or more logic controls for controlling operation of the bonding machine. FIG. 7 illustrates one embodiment of a first control cabinet 126a and a second control cabinet 126b for controlling the bonding machine 102. The control cabinets 126a, 126b may be mounted to the side of the bonding table 116. It will be appreciated by those skilled in the art that the control cabinets 126a, 126b may be located anywhere on the bonding machine 102 or may be a stand-alone unit connected to the bonding machine 102 through any suitable communications medium. In the example shown, the first control cabinet 126a comprises a controller for a single bonding arm 104a of the bonding machine 102. The second control cabinet 126b comprises controllers for the other four bonding arms 104b-104e of the bonding machine 102. Those skilled in the art will appreciate that the first and second control cabinets 126a, 126b may be combined into a single control cabinet. The first and second control cabinets 126a, 126b comprise temperature controllers 128a-128e for setting and monitoring the operating temperature of the heating elements 106a-106e. The control cabinets 126a, 126b may further comprise switches for electrically controlling the operation of the bonding arms 104a-104e. In addition, the control cabinets 126a, 126b may comprise a combination of air regulators, valves, and other controllers for controlling one or more functions of the bonding machine 102.

Figure 8:
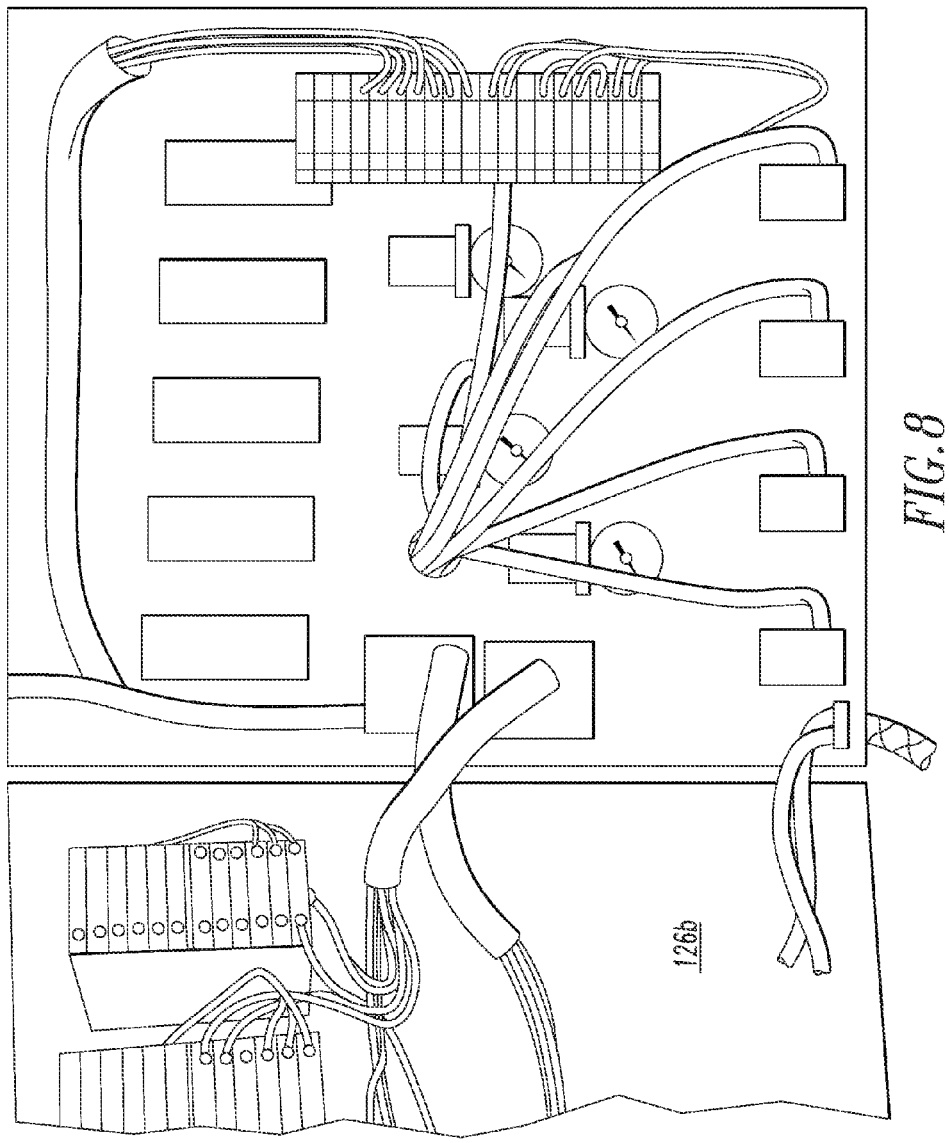
FIGS. 8-10 illustrate various aspects of an example of a manual control system for a bonding machine.
Figure 9:
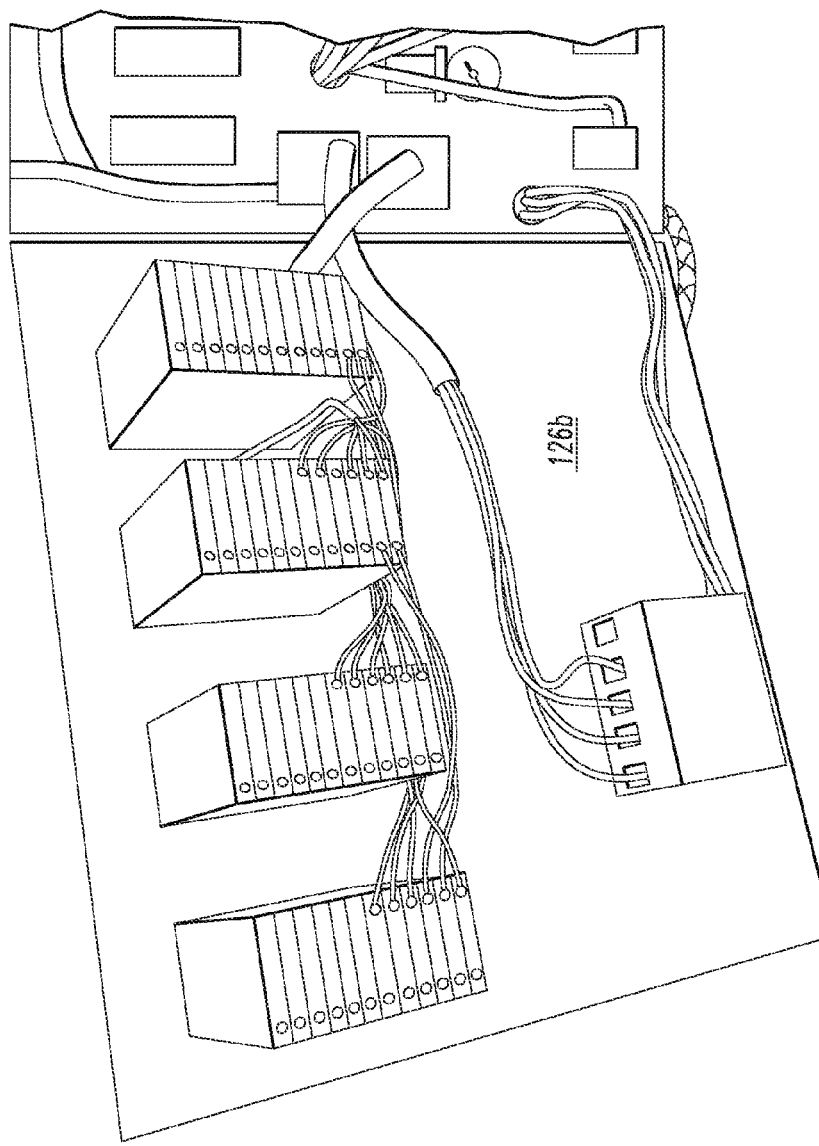
Figure 10:
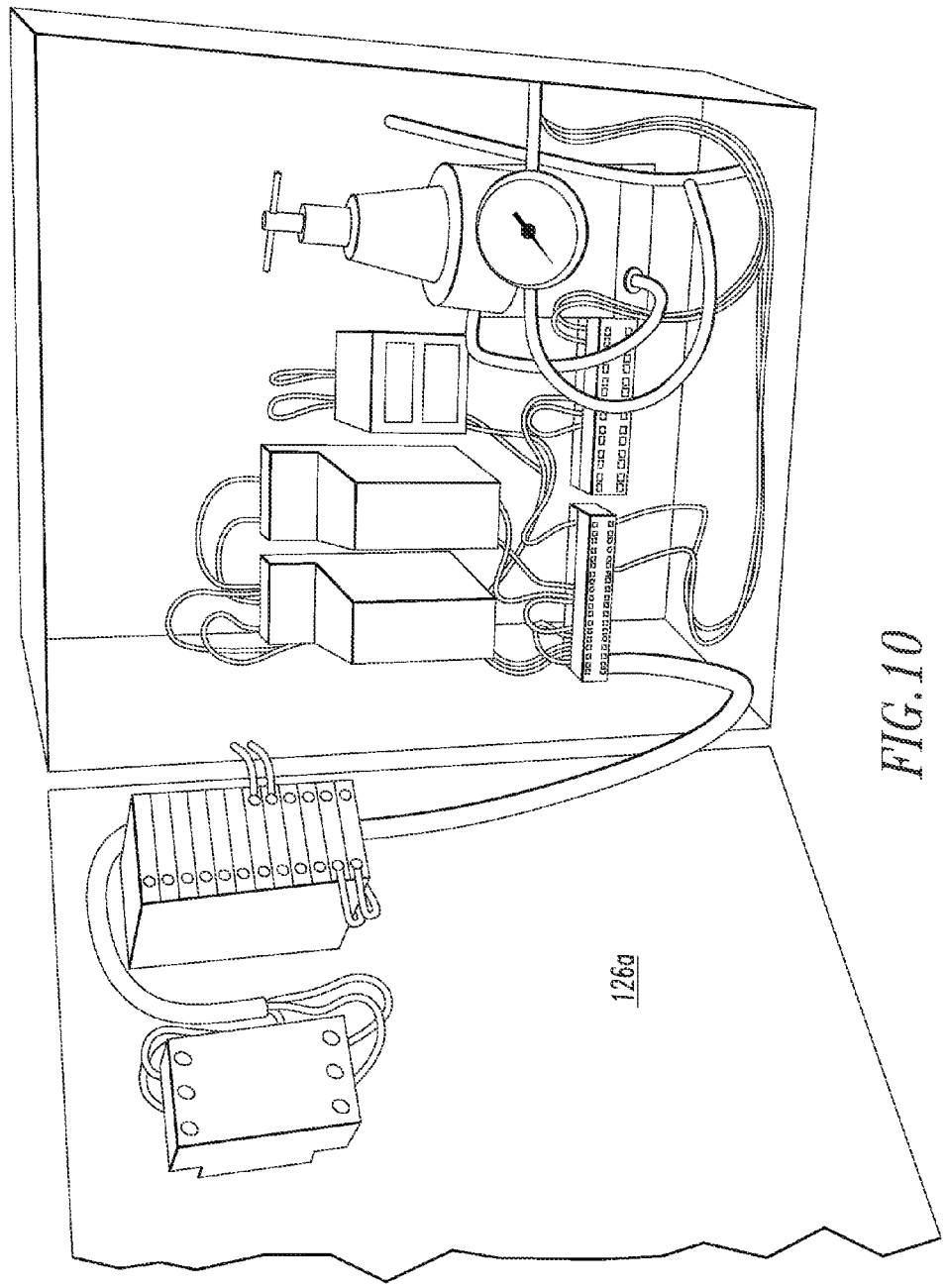

FIGS. 8-10 illustrate one embodiment of a control system comprising control cabinets 126a, 126b for the bonding machine 102. The illustrated control system can be configured for individually controlling the operation of the bonding arms 104a-104e. As can be seen in FIGS. 8-10, the control cabinets 126a, 126b may comprise one or more solid-state relays, valves, regulators, and controllers for controlling the operation of the bonding arms 104a-104e. In certain embodiments, the solid-state relays may be individually triggered to allow different application timings, sequences of activation of the bonding arms 104a-104e, and/or to resist or discontinue actuation of one or more of the bonding arms 104a-104e. The illustrated embodiment further comprises individual control valves and regulators for each of the pneumatic arms 108a-108e connected to the bonding arms 104a-104e. By providing individually variable valves and regulators, the pressure applied by each of the pneumatic arms 108a-108e may be individually regulated. In one embodiment, the control cabinet 126b may further comprise a three-phase power assembly for providing distributed power to the solid-state relays and regulators located within the control cabinet 126b.

Figure 11:
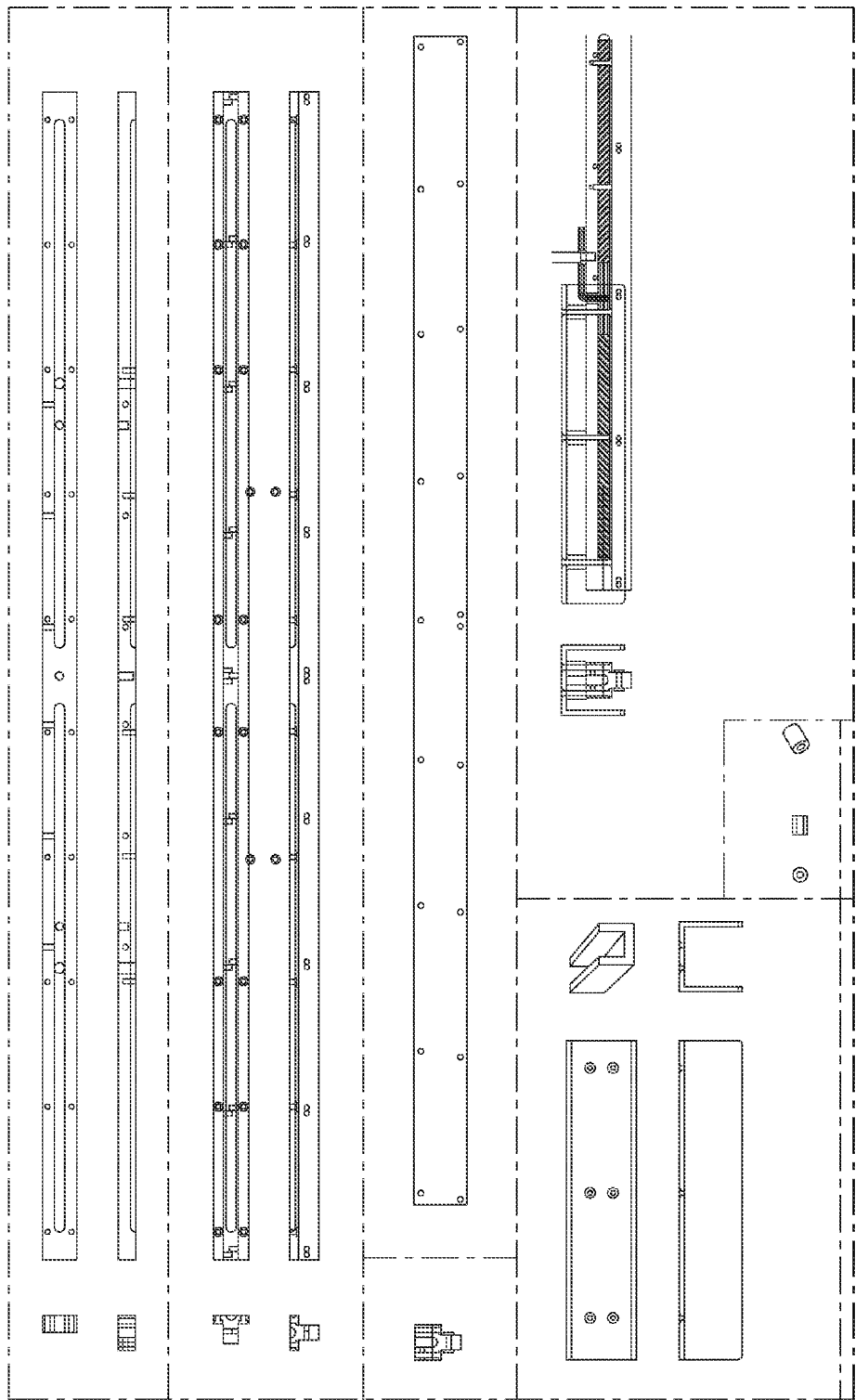
FIG. 11 illustrates an example of a heating bar structured for use in operative association with a bonding arm.

FIG. 11 illustrates aspects of an example of a heating bar 117. As shown, each heating bar 117 may comprise multiple heating elements 106a-106d, a non-adhesive Teflon tape covering the heating elements 106a-106d, and/or a guard assembly located over the heating bar 117 to resist accidental contact with the heating bar 117.

Figure 12:
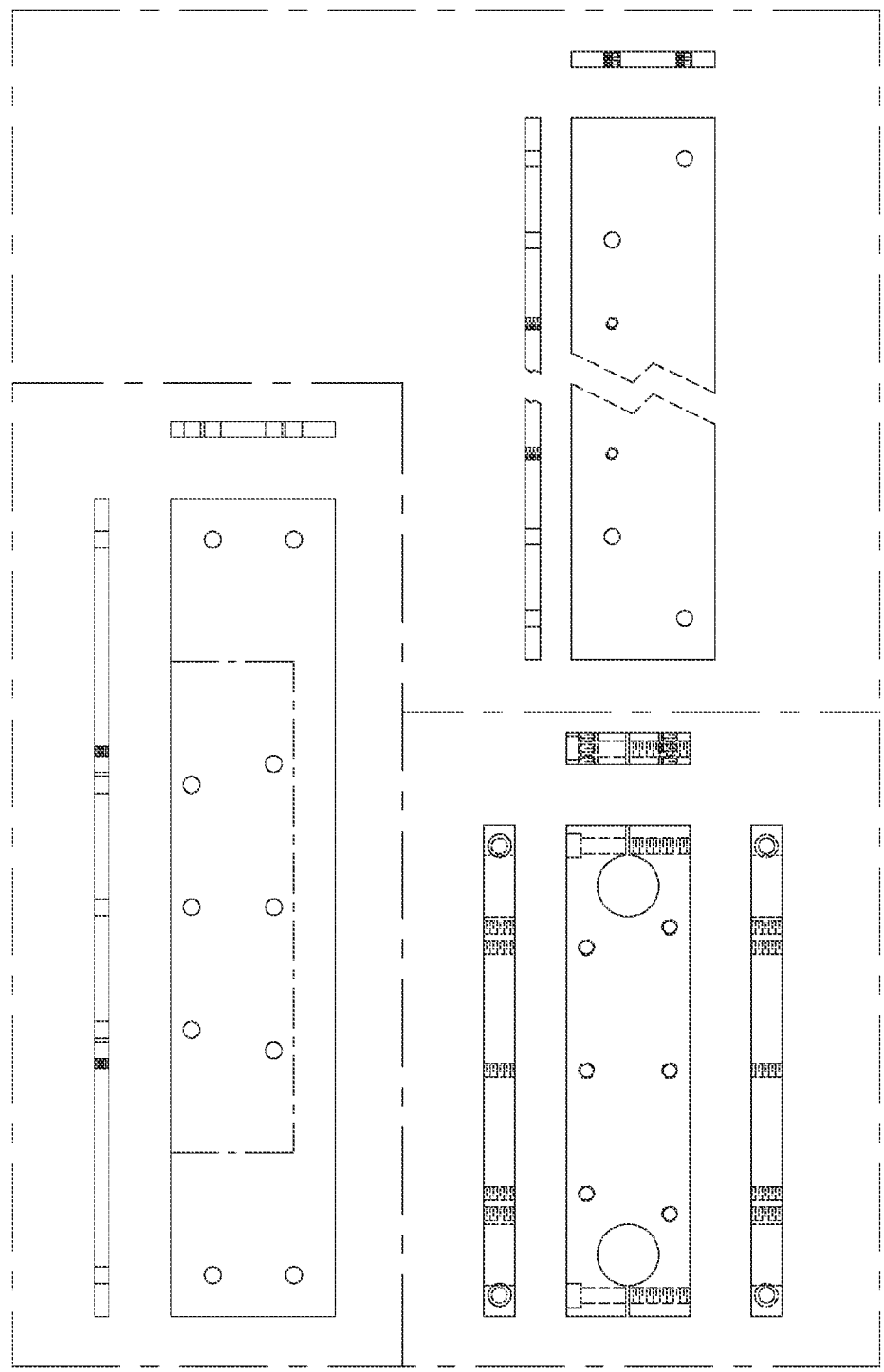
FIGS. 12-14 illustrate various aspects of examples of horizontal supports, guide rails, and heating bars structured for use in association with a bonding machine.
Figure 13:
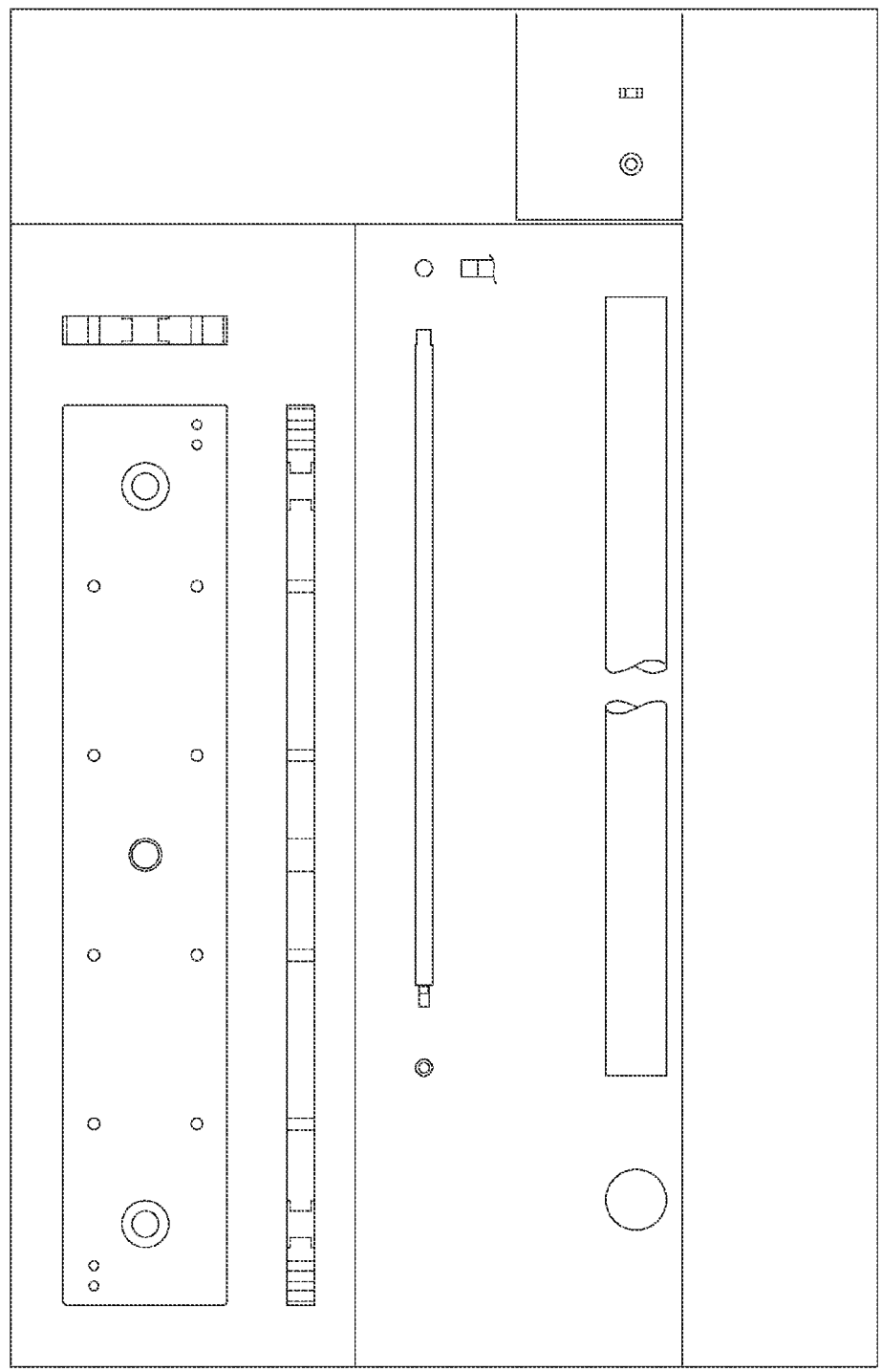
Figure 14:
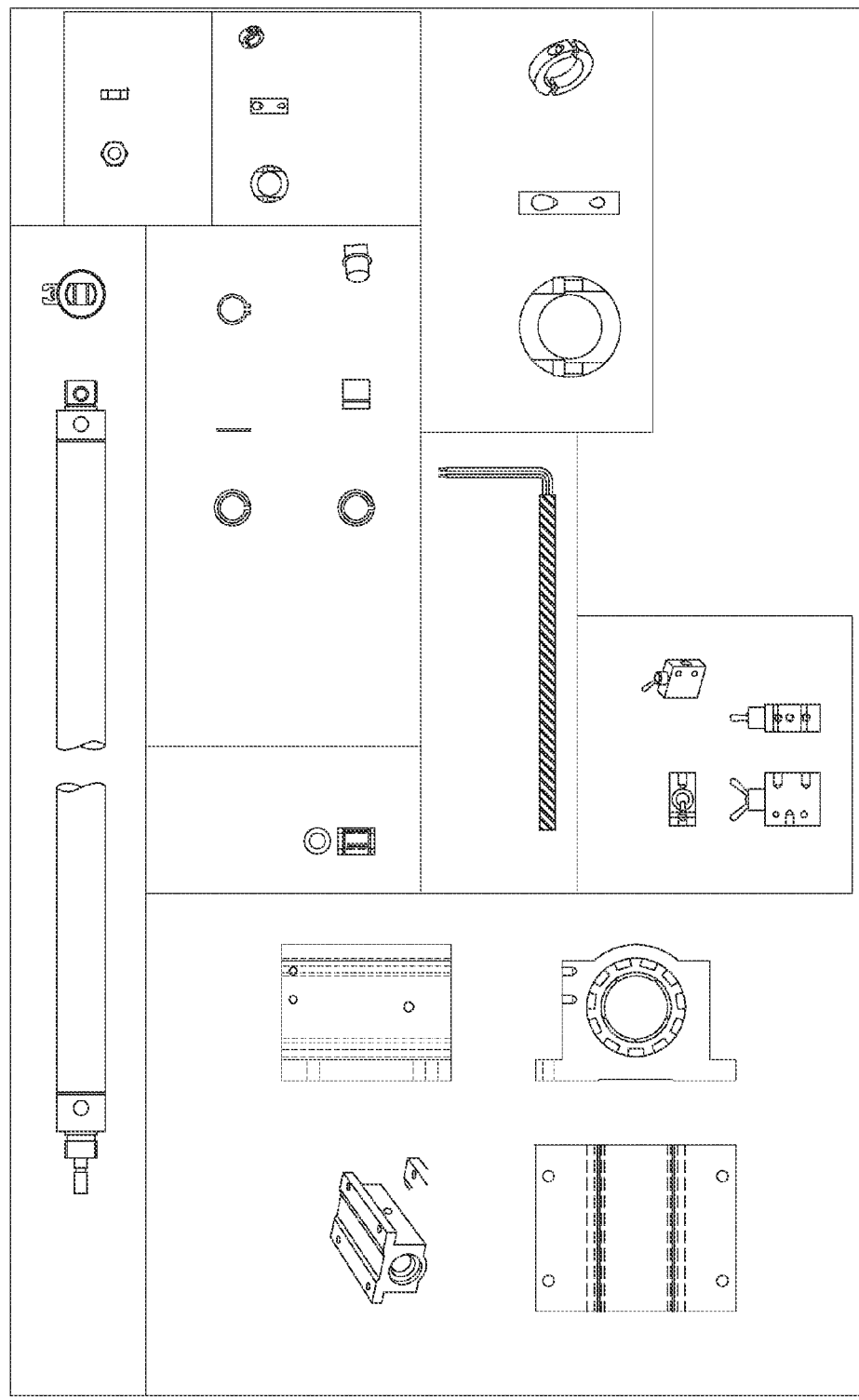

FIGS. 12-14 illustrate various embodiments of the components of the bonding machine 102. FIG. 12 illustrates aspects of examples of the guide bars 122, the vertical supports 114, and a support bar for affixing the control box 126 to the bonding table 116. FIG. 13 illustrates one embodiment of a top plate for the bonding arms 104a-104e comprising one or more holes for receiving the guide bars 122. FIG. 14 illustrates examples of various components structured for coupling the bonding table 116, the vertical supports 114, the guide rails 112, the supports 110, and the bonding arms 104a-104e.

Figure 15A:
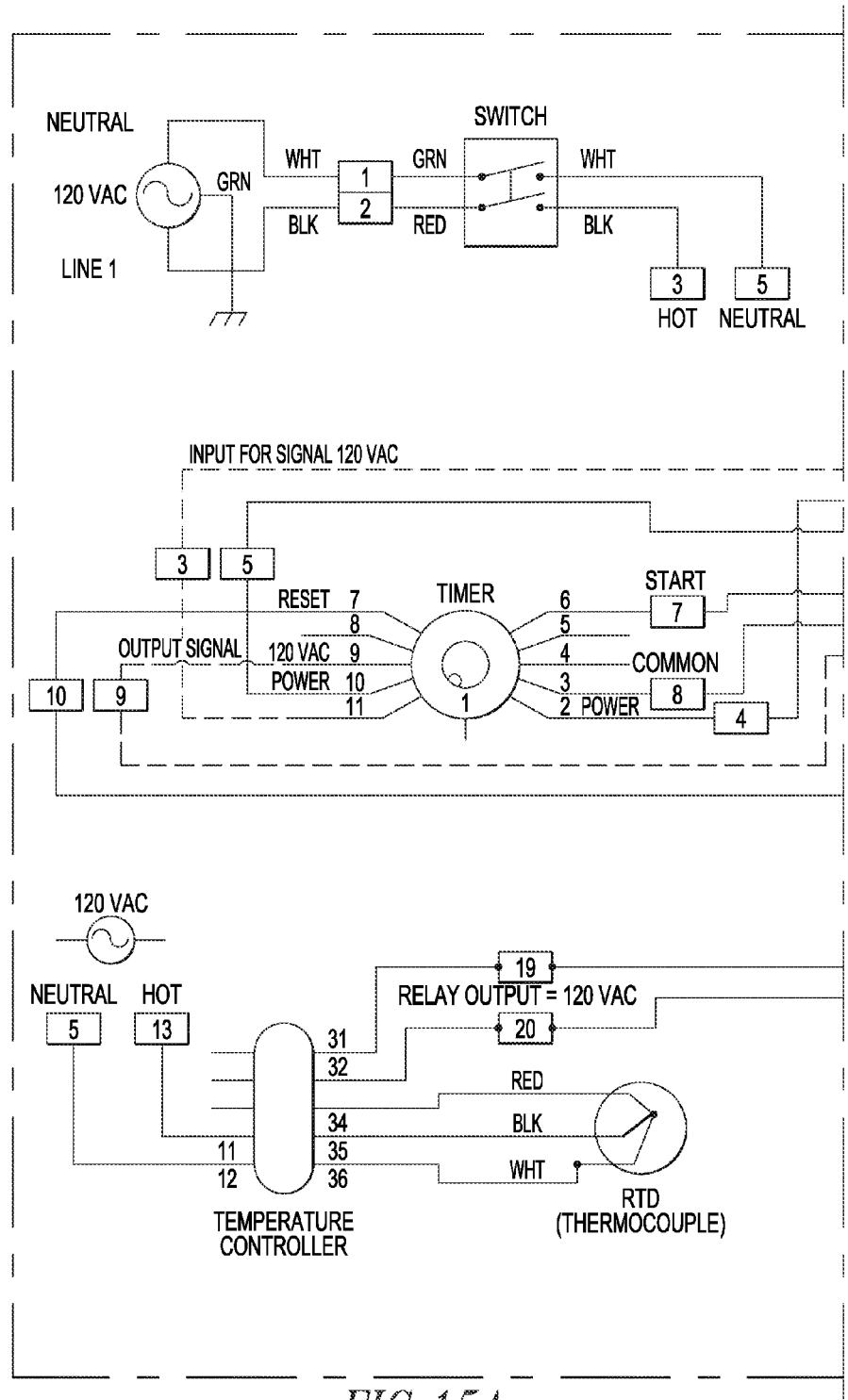
FIG. 15 illustrates an example of an electrical control system for a bonding arm.
Figure 15B:
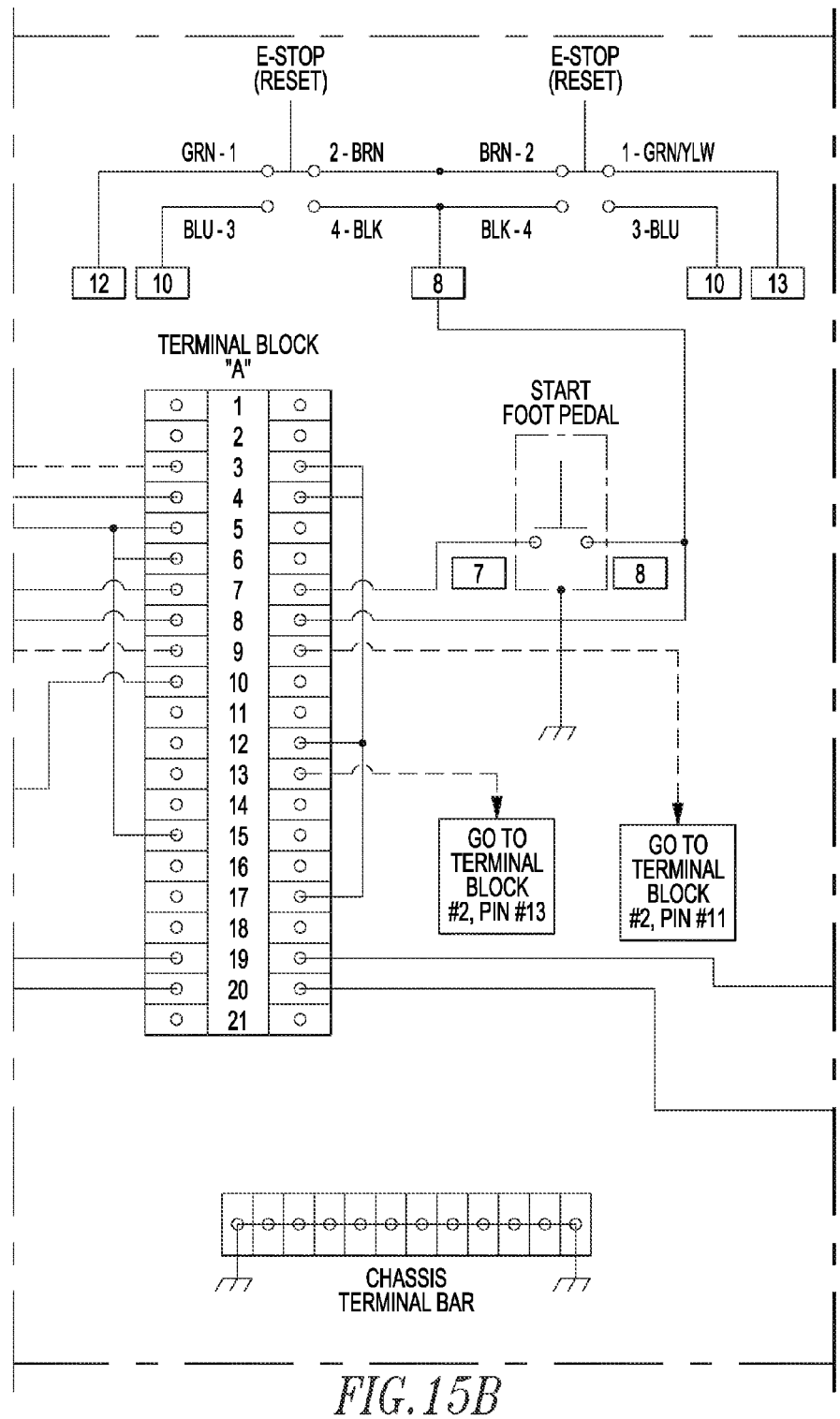
Figure 15C:
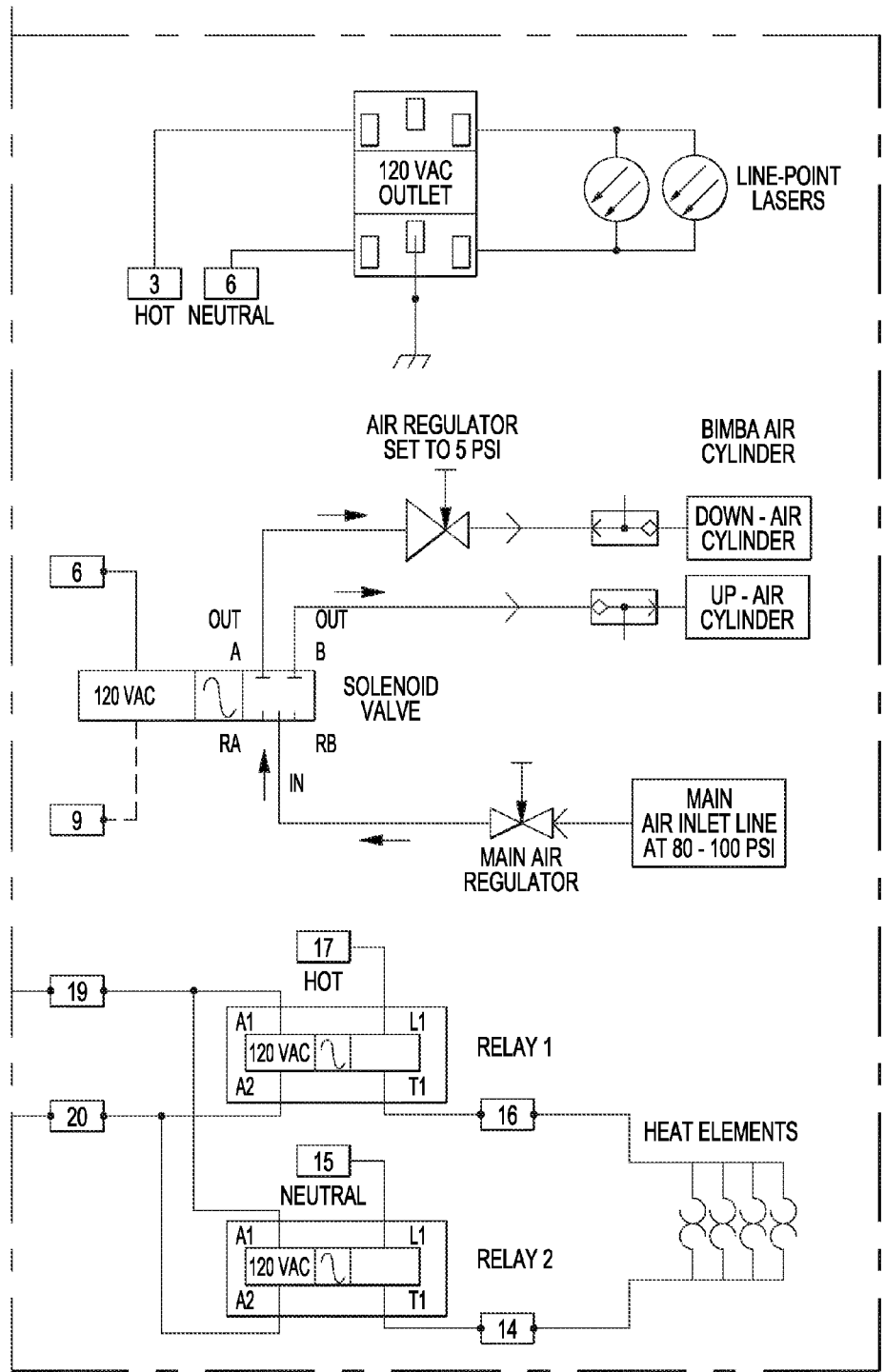
Figure 16A:
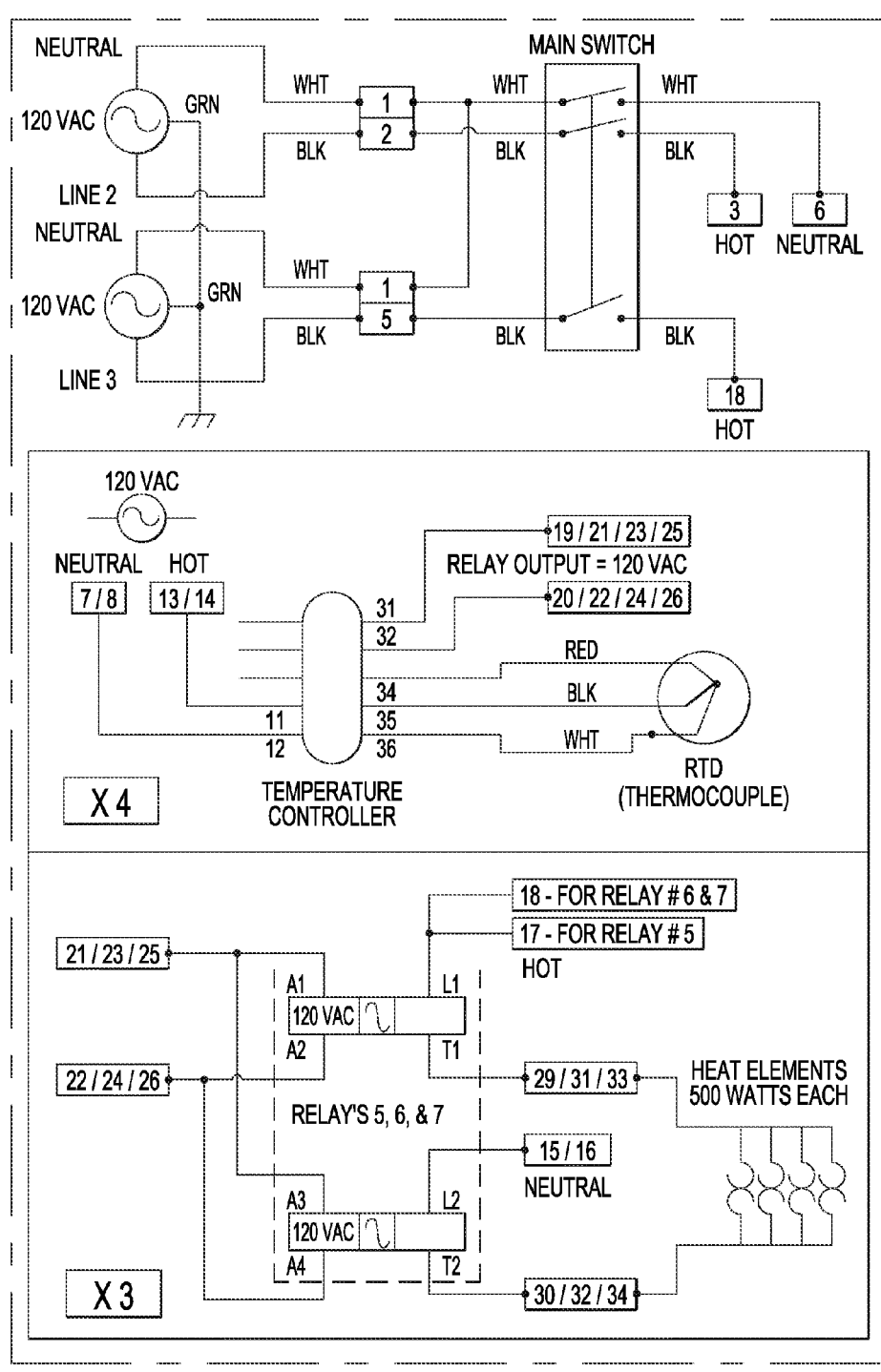
FIG. 16 illustrates an example of an electrical control system configured for use in association with a bonding machine including five bonding arms; and, FIG. 17 illustrates an example of a sleeping bag comprising two materials bonded together utilizing a bonding machine structured in accordance with various embodiments of the present invention.
Figure 16B:
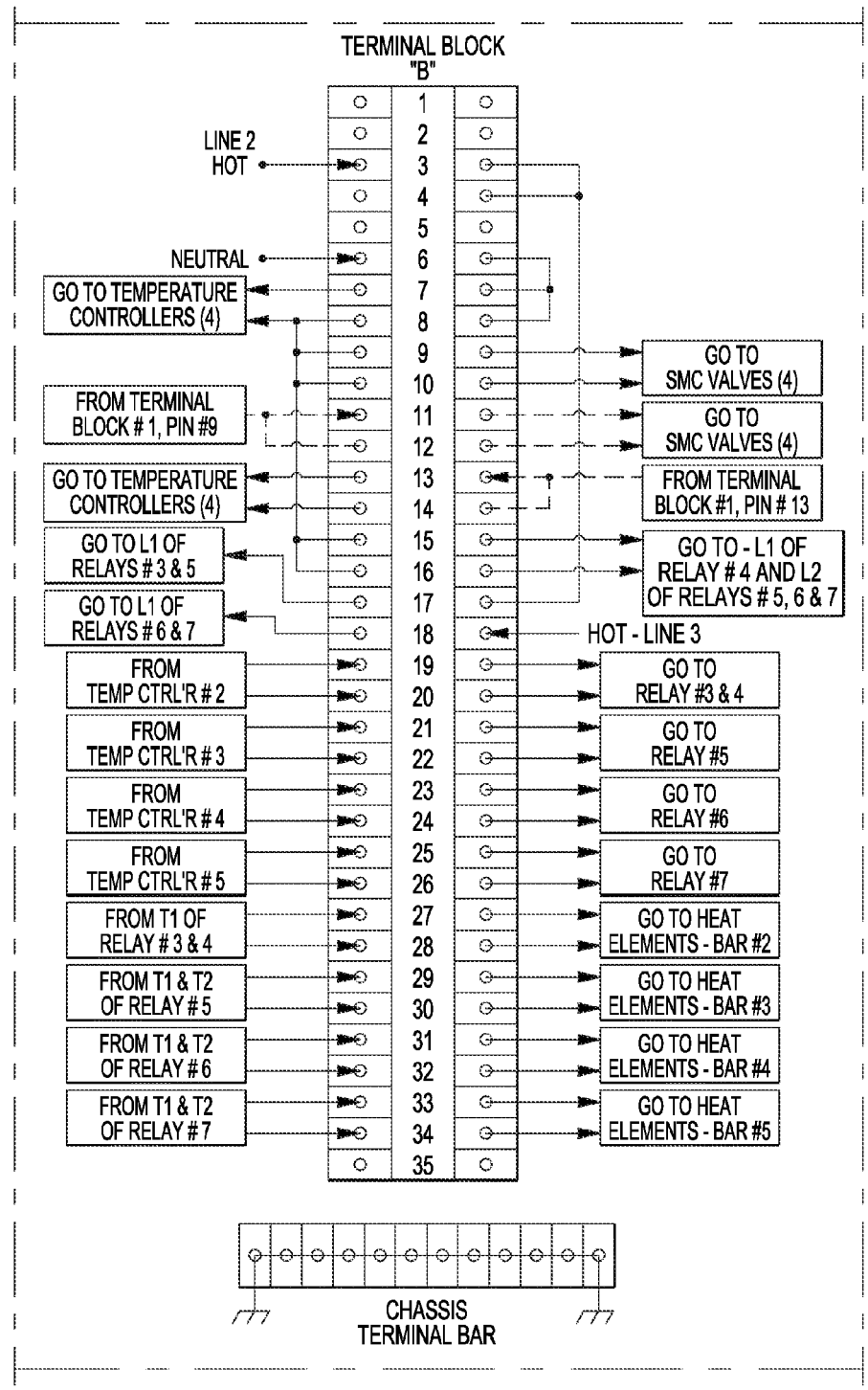
Figure 16C:
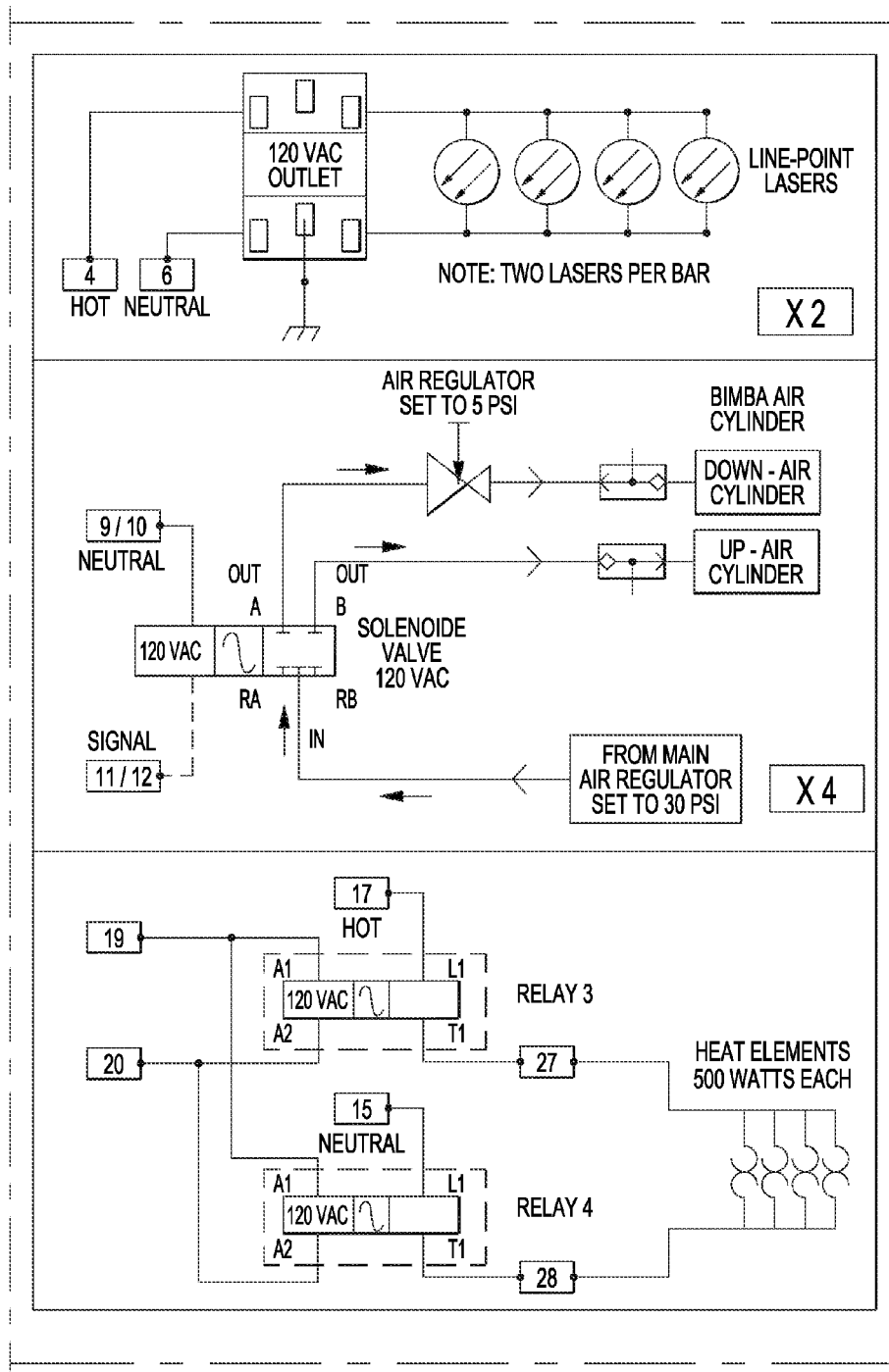

FIGS. 15 and 16 illustrate examples of electrical circuit diagrams for power control systems that can be programmed or configured for controlling the bonding machine 102. FIG. 15 illustrates a diagram of a control scheme for a single bonding arm 104a. FIG. 16 illustrates a diagram of a control scheme for a bonding machine 102 comprising five bonding arms 104a-104e. It will be appreciated by those skilled in the art that the illustrated control systems may be scaled for controlling a bonding machine 102 comprising many different combinations of bonding arms 104.

FIG. 17 illustrates an example of a sleeping bag 300 formed by using the bonding machine 102. FIG. 17 includes two views of the sleeping bag 300, a top view and a cross-sectional view taken along line A-A. As shown, the sleeping bag 300 comprises an outer fabric 302 and an inner fabric 304. In one embodiment the outer fabric 302 may comprise a shell fabric for covering an outer surface. In another embodiment, the outer fabric 302 may comprise a lining material. In another embodiment, the outer fabric 302 may comprise both a shell fabric and a lining material. The inner fabric 304 may comprise an insulation material, for example. A bonding agent 308 may be placed between the outer fabric 302 and the inner fabric 304 in an alternating pattern. In operation, the shell lining fabric 302, the insulation fabric 304, and the bonding agent 308 may be arranged on the bonding table 116 in a predetermined pattern, such as the predetermined pattern shown in FIG. 17, for example. The bonding arms 104a-104e may be aligned with appropriate locations along the bonding material 308. Once properly aligned, the temperature setting, pressure setting, application timing setting, sequence setting, and other settings may be configured for each bonding arm 104a-104e. In certain embodiments, one or more settings may be individually configured to promote proper bonding of the bonding agent 308 located beneath each respective bonding arm 104a-104e. The bonding arms 104a-104e may then be applied to the sleeping bag 300 to create a bond between the outer fabric 302 and the inner fabric 304 by use of the bonding agent 308. After the bonding cycle has been completed, the bonding arms 104a-104e may be retracted, leaving the sleeping bag 300 with spaced bonds along the length of the sleeping bag 300.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

It will be appreciated that, for convenience and clarity of disclosure, terms describing relative orientation or spatial positioning such as "proximal," "distal," "vertical," "horizontal," "up," "down," "top," "bottom," "upward," or "downward" may be used at times herein with respect to the drawings and text description in association with various embodiments of the invention. However, such terms are primarily used for illustrative purposes and are not necessarily intended to be limiting in nature.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art. For example, there may be variations to these diagrams or the operations described herein without departing from the spirit of the invention.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A bonding machine for bonding two fabric layers together, the bonding machine comprising:
   a bonding table for supporting the two fabric layers thereon, the two fabric layers having a thermally-activated bonding agent therebetween;
   a support bar connected to the bonding table;
   a plurality of independently controllable bonding arms movably coupled to the support bar, each of the bonding arms comprising:
      a heating bar including at least one heating element; and
      an actuator configured to provide movement of the heating bar between the support bar and the bonding table supporting the two fabric layers thereon, wherein pressure and heat from the heating bar cause the bonding agent to bond the two fabric layers; and
   a controller connected to the plurality of independently controllable bonding arms to independently control:
      actuation of the bonding arms such that each bonding arm's motion is independent of the other bonding arms;
      pressure applied by the bonding arms when actuated; and
      the temperature of the at least one heating element of the heating bar of each of the plurality of bonding arms, such that when the bonding arm is actuated, the thermally-activated bonding agent between the two fabric layers is sufficiently heated to bond the two fabric layers.

2. The bonding machine of claim 1, wherein the actuator includes at least one pneumatic actuator.

3. The bonding machine of claim 1, wherein at least one of the heating elements includes a thermal heating element structured for delivering thermal energy to the two fabric layers with the thermally-activated bonding agent therebetween.

4. The bonding machine of claim 1, wherein at least one of the bonding arms is structured to move with respect to the support bar to adjust at least one spacing between two or more bonding arms.

5. The bonding machine of claim 1, further comprising a guidance system programmed for aligning at least one bonding arm with at least a portion of the bonding table.

6. The bonding machine of claim 5, wherein the guidance system includes at least one laser positioned to project a laser beam onto the bonding table at a position corresponding to an extended state of the bonding arm on the bonding table.

7. The bonding machine of claim 1, further comprising a plurality of alignment markings located on the bonding table to facilitate placement of the two fabric layers on the bonding table.

8. The bonding machine of claim 1, wherein each of the bonding arms comprises a pneumatic actuator for movement of the heating bar of the bonding arm toward the bonding table when actuated.

9. The bonding machine of claim 8, wherein the controller comprises an electromechanical controller for individually controlling the plurality of bonding arms.

10. The bonding machine of claim 9, further comprising at least one vertical support that connects the bonding table to the support bar so that the support bar is spaced from and faces the bonding table.

11. The bonding machine of claim 10, wherein each of the plurality of bonding arms is slidably mounted to the support bar.

12. The bonding machine of claim 1, wherein the at least one heating element comprises a cartridge heater.

13. The bonding machine of claim 11, wherein the at least one heating element comprises a cartridge heater.

* * * * *